United States Patent
Hsiung et al.

(10) Patent No.: US 9,370,058 B2
(45) Date of Patent: Jun. 14, 2016

(54) DRIVING CIRCUIT OF LIGHT-EMITTING DIODE AND DRIVING METHOD THEREOF

(71) Applicant: GETAC TECHNOLOGY CORPORATION, Hsinchu County (TW)

(72) Inventors: Ta-Sung Hsiung, Taoyuan County (TW); Jui-Lin Hsu, Keelung (TW)

(73) Assignee: Getac Technology Corporation, Hsinchu County (TW)

( * ) Notice: Subject to any disclaimer, the term of this patent is extended or adjusted under 35 U.S.C. 154(b) by 334 days.

(21) Appl. No.: 14/099,887

(22) Filed: Dec. 6, 2013

(65) Prior Publication Data

US 2014/0346953 A1  Nov. 27, 2014

Related U.S. Application Data

(60) Provisional application No. 61/826,136, filed on May 22, 2013.

(51) Int. Cl.
*H05B 37/00* (2006.01)
*H05B 33/08* (2006.01)

(52) U.S. Cl.
CPC ........ *H05B 33/0815* (2013.01); *H05B 33/0827* (2013.01)

(58) Field of Classification Search
CPC .................. H05B 33/0815; H05B 33/0887
USPC .......................... 315/121, 210, 224
See application file for complete search history.

(56) References Cited

U.S. PATENT DOCUMENTS

2012/0229045 A1\*  9/2012  Kikuchi ............ H05B 33/0818
                                                          315/224

\* cited by examiner

*Primary Examiner* — Lincoln Donovan
*Assistant Examiner* — Thomas Skibinski

(57) ABSTRACT

The present invention relates to a driving circuit of LED and a driving method thereof, which comprise a converting circuit and a driving unit. The converting circuit receives a pulse-width modulation (PWM) signal and generates an adjusting current according to the PWM signal. The driving unit receives the adjusting current and generates at least a driving current according to the adjusting current for driving a plurality of LEDs coupled to the driving unit. The magnitude of the driving current is adjusted according to the adjusting current. In addition, the driving unit has a bright-controlling pin used for receiving a control signal having a fixed level.

17 Claims, 6 Drawing Sheets

US 9,370,058 B2

DRIVING CIRCUIT OF LIGHT-EMITTING DIODE AND DRIVING METHOD THEREOF

FIELD OF THE INVENTION

The present invention relates generally to a driving circuit and a driving method, and particularly to a driving circuit of light-emitting diode and a driving method thereof.

BACKGROUND OF THE INVENTION

A light-emitting diode (LED) is a semiconductor electronic device capable of emitting light and composed by p- and n-type semiconductor materials. It can generate self-radiating light in the ultraviolet light, visible light, and infrared light zones. Because an LED has the advantages of saving energy, long lifetime, and high brightness, in the trend of environmental protection, saving power, and reducing carbon emission, the applications of LED have become extensive increasingly, for example, traffic lights, streetlamps, flashlights, display devices, or lighting apparatuses.

Currently, most LED display devices, such as notebook computers or LCD panels, output pulse width modulation (PWM) signals as the light adjusting signals for LEDs using driving circuits. Thereby, the duty cycles of the switching signals can be adjusted and the LEDs are switched on and off in high frequencies for achieving the purpose of tuning their brightness. Please refer to FIG. 1, which shows waveforms of PWM and switching signals according to the prior art. As shown in the figure, when the PWM signal is high level, the switching signal $S_1$ turns on the LED by high-frequency switching; when the PWM signal is low level, the switching signal $S_1$ is lowered the low level to turn off the LED. Because the LED is turned off when the PWM signal is low level and turned on only when the PWM signal is high level according to this method, the glitter phenomenon, which is hardly aware by human eyes but harmful to visual perception, will occur.

Although the switching frequency of the LED by the switching signal $S_1$ may be high (approximately between 170 and 270 Hz) and people cannot be conscious of the glitter phenomenon, the ciliary muscles in human eyes will respond to the glitter spontaneously. Therefore, staring at such display devices for a long time fatigues the ciliary muscles. Even worse, it can cause the problems of high intraocular pressure and feeling like vomiting.

Accordingly, the present invention provides a driving circuit for LED and a driving method thereof, which solve the glitter problem in LEDs by outputting a stable driving current to the LEDs.

SUMMARY

An objective of the present invention is to provide a driving circuit of LED and a driving method thereof, which adjust the driving current of LED according to the duty cycle of the PWM signal for adjusting the brightness of LED.

For achieving the objective and effect described above, the present invention discloses a driving circuit of LED, which comprises a converting circuit and a driving unit. The converting circuit receives a PWM signal and generates an adjusting current according to the PWM signal. The driving unit receives the adjusting current and generates at least one driving current according to the adjusting current for driving a plurality of LEDs coupled to the driving unit. The magnitude of the driving current is adjusted according to the adjusting current. In addition, the driving unit has a bright-controlling pin used for receiving a control signal having a fixed level.

The present invention further discloses a driving method of LED, which comprises the steps of: transmitting a PWM signal to a converting circuit and generating an adjusting current according to the PWM signal; transmitting the adjusting current to a driving unit and generating at least one driving current according to the adjusting current,. wherein the driving current is used for driving a plurality of LEDs and the magnitude of the driving current is adjusted according to the adjusting current; and transmitting a control signal having a fixed signal to a bright-controlling pin of the driving unit.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
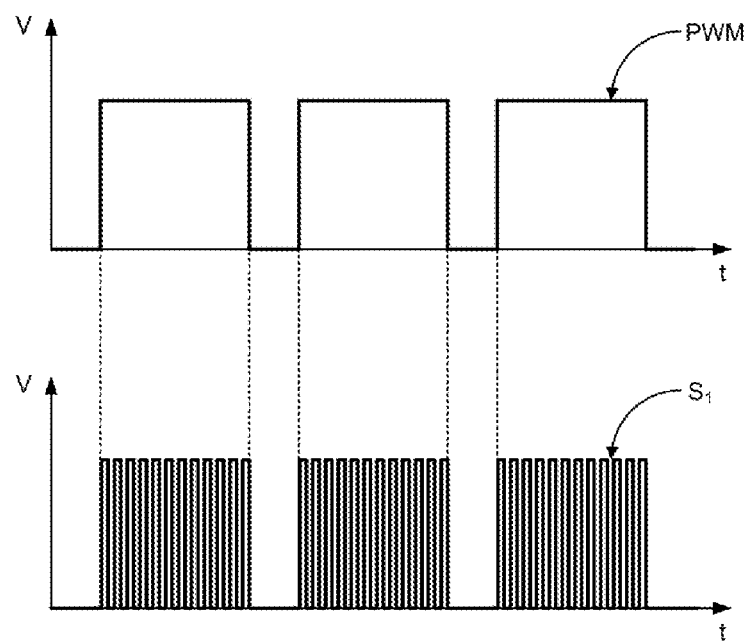
FIG. 1 shows waveforms of PWM versus switching signals according to the prior art.
Figure 2:
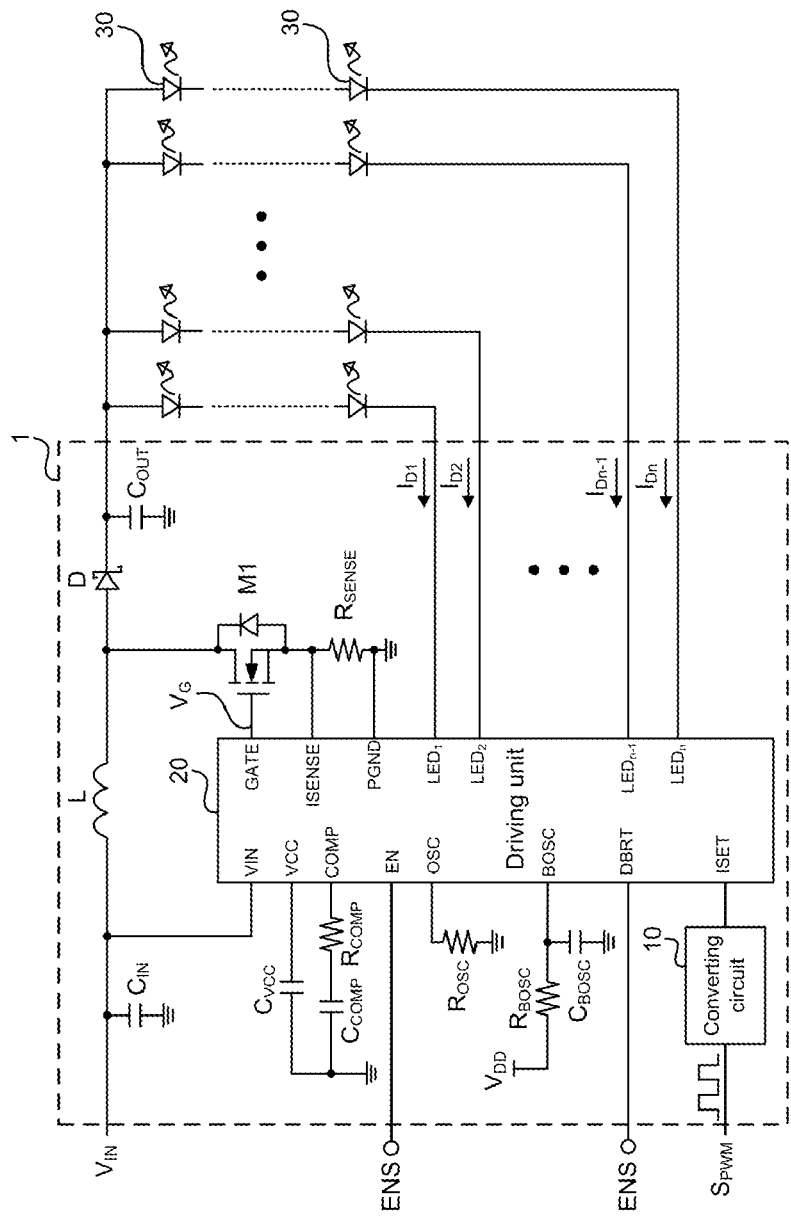
FIG. 2 shows a circuit diagram of the driving circuit of LED according to a preferred embodiment of the present invention.
Figure 4:
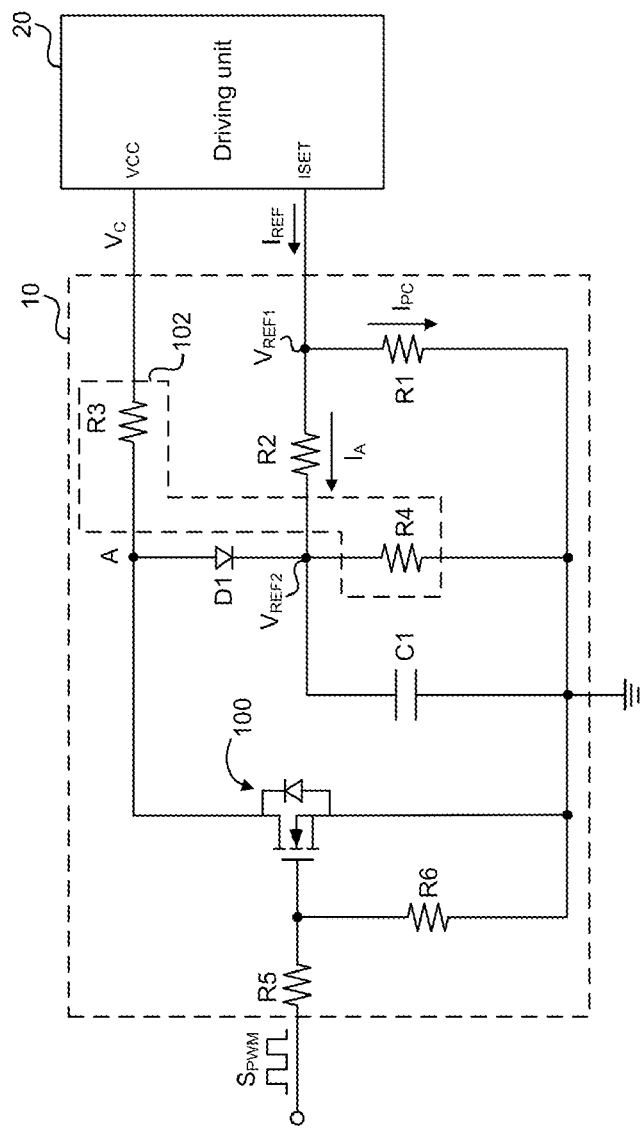
FIG. 4 shows a circuit diagram of the converting circuit according to a preferred embodiment of the present invention.

FIG. 2 shows a circuit diagram of the driving circuit of LED according to a preferred embodiment of the present invention. As shown in the figure, the driving circuit 1 of LED according to the present invention comprises a converting circuit 10 and a driving unit 20. The converting circuit 10 receives a PWM signal $S_{PWM}$ and produces an adjusting current according to the PWM signal $S_{PWM}$, as shown in FIG. 4. A set pin ISET of the driving unit 20 receives the adjusting current and produces at least one driving current $I_{D1}$-$I_{Dn}$ according to the adjusting current. The plurality of driving currents $I_{D1}$-$I_{Dn}$ drive a plurality of LEDs 30 via a plurality of LED pins $LED_1$-$LED_n$ of the driving unit 20. The magnitude of the plurality of driving currents $I_{D1}$-$I_{Dn}$ is adjusted according to the adjusting current.

In addition, the driving unit 20 further comprises an input power pin VIN, a supply voltage pin VCC, a compensation pin COMP, a frequency set pin OSC, a light-tuning frequency set pin BOSC, an enable control pin EN, a bright-controlling pin DBRT, a gate control pin GATE, a current sensing pin ISENSE, and a ground pin PGND.

The input power pin VIN receives an input voltage $V_{IN}$ stabilized by an input capacitor $C_{IN}$. The input voltage $V_{IN}$ is further transmitted to the LED 30 via an inductor L, a diode D, and an output capacitor $C_{OUT}$ and used as the power source for producing the plurality of driving currents $I_{D1}$-$I_{Dn}$. A transistor M1 has a first terminal, a second terminal, and a control terminal. The first terminal of the transistor M1 is coupled to the junction between the inductor L and the diode D. The second terminal of the transistor M1 is coupled to the current sensing pin ISENSE. The control terminal of the transistor M1 is coupled to the gate control pin GATE for switching according to a gate control signal $V_G$ output by the gate control pin GATE. A sensing resistor $R_{SENSE}$ is coupled between the current sensing pin ISENSE and the ground pin PGND. The ground pin PGND is further coupled to a ground. When the transistor M1 is turned on, the sensing resistor $R_{SENSE}$ converts the received current to a current sensing signal and outputs the current sensing signal to the current sensing pin ISENSE.

A capacitor $C_{VCC}$ is coupled between the supply voltage pin VCC and the ground. A capacitor $C_{COMP}$ is connected in series with a resistor $R_{COMP}$ and coupled between the compensation pin COMP and the ground. A resistor $R_{OSC}$ is coupled between the frequency set pin OSC and the ground. A resistor $R_{BOSC}$ receives a supply voltage $V_{DD}$ and is coupled to the light-tuning frequency set pin BOSC. A capacitor $C_{BOSC}$ is coupled between the light-tuning frequency set pin BOSC and the ground. The enable control pin EN is used for receiving an enable signal ENS and enabling the driving unit 20. The bright-controlling pin DBRT receives a control signal, and the control signal has a fixed level. According to this embodiment of the present invention, the fixed level of the control signal is high level.

Besides, because the level of the enable signal ENS received by the enable control pin EN is high level and the level of the control signal received by the bright-controlling pin DBRT is also high level, when the enable signal ENS is transmitted to the enable control pin EN, it can be transmitted to the bright-controlling pin DBRT simultaneously. Thereby, when the enable signal ENS is used as the control signal of the bright-controlling pin DBRT, it is not necessary to generate another signal, simplifying the circuit complexity and further shrinking the circuit area. Nonetheless, the present invention is not limited to the case where the control signal is just the enable signal ENS; the control signal can be another high-level signal.

Figure 3:
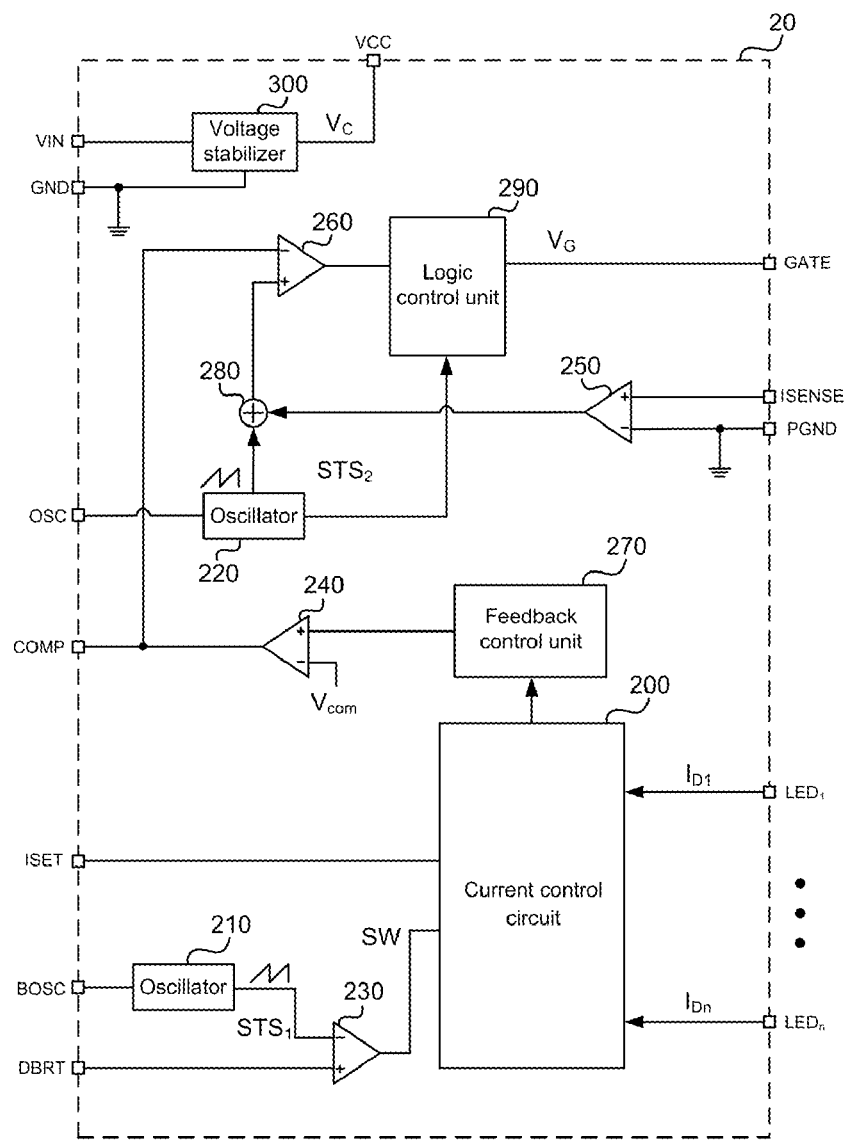
FIG. 3 shows a circuit diagram of the driving unit according to a preferred embodiment of the present invention.

Please refer to FIG. 3, which shows a circuit diagram of the driving unit according to a preferred embodiment of the present invention. As shown in the figure, the driving unit 20 comprises a current control circuit 200, a plurality of oscillators 210, 220, a plurality of comparators 230, 240, 250, 260, a feedback control unit 270, an operational unit 280, a logic control unit 290, and a voltage stabilizer 300. The current control circuit 200 is coupled between the set pin ISET and the plurality of LED pins $LED_1$-$LED_n$ and coupled to the converting circuit 10 via the set pin ISET then coupled to the plurality of LEDs 30 via the plurality of LED pins $LED_1$-$LED_n$. The current control circuit 200 is used for producing the plurality of driving currents $I_{D1}$-$I_{Dn}$ according to the adjusting current generated by the converting circuit 10.

The oscillator 210 is coupled between the light-tuning frequency set pin BOSC and a negative input of the comparator 230 and outputs a saw-toothed signal $STS_1$ to the negative input of the comparator 230. A positive input of the comparator 230 is coupled to bright-controlling pin DBRT for receiving the enable signal ENS. The comparator 230 compares the enable signal ENS and the saw-toothed signal $STS_1$ and outputs a switching signal SW for switching and producing the plurality of driving currents $I_{D1}$-$I_{Dn}$. Because the enable signal ENS maintains at the high level as the driving circuit 1 is operated normally and maintains at the low level as the driving circuit 1 stops operating, the switching signal SW output by the comparator 230 is maintained at the high level continuously when the driving circuit 1 is operated normally, such that the current control circuit 200 can keep producing the plurality of driving currents $I_{D1}$-$I_{Dn}$. Thereby, the situation of the driving currents reducing to the low level for a longer period of time and resulting in the glitter phenomenon as seen in the prior art will not occur.

A positive input of the comparator 250 is coupled to the current sensing pin ISENSE; a negative input of the comparator 250 is coupled to the ground pin PGND and the ground. The comparator 250 compares the voltage levels between the current sensing signal and the ground, outputting a comparing signal to the operational unit 280. The feedback control unit 270 is used for detecting the output signal of the current control circuit 200 and outputting a feedback signal to a positive input of the comparator 240. A negative input of the comparator 240 receives a comparing voltage $V_{com}$. The comparator 240 outputs a compensating signal to the compensation pin COMP after comparing the feedback signal and the comparing voltage $V_{com}$, and which is used for compensating the circuit. The oscillator 220 is coupled among the frequency set pin OSC, the operational unit 280, and the logic control unit 290, and outputs a saw-toothed signal $STS_2$ to the operational unit 280 and the logic control unit 290. The operational unit 280 operates the saw-tooth signal $STS_2$ and the comparing signal and outputs to a positive input of the comparator 260. A negative input of the comparator 260 receives the compensation signal. The comparator 260 compares the compensation signal and the operating result output by the operational unit 280 and outputs. Meanwhile, the logic control unit 290 generates the gate control signal $V_G$ according to the output of the comparator 260 and the saw-tooth signal $STS_2$. The frequency of the gate control signal $V_G$ corresponds to the switching signal SW.

The voltage stabilizer 300 is coupled to the input power pin VIN, the supply voltage pin VCC, and the ground, and a supply voltage $V_C$ is generated at the supply voltage pin VCC according to the input voltage $V_{IN}$ received at the input power pin VIN.

Please refer to FIG. 4, which shows a circuit diagram of the converting circuit according to a preferred embodiment of the present invention. As shown in the figure, the converting circuit 10 comprises a plurality of resistors R1, R2, a voltage dividing circuit 102, and a switch 100. The resistor R1 has a first terminal and a second terminal. The first terminal of the resistor R1 is coupled to the set pin ISET of the driving unit 20 for receiving a reference voltage $V_{VREF1}$ output by the driving unit 20. The second terminal of the resistor R1 is coupled to the ground. In addition, a predetermined current $I_{PC}$ is generated at the resistor R1. The magnitude of the predetermined current $I_{PC}$ is determined according to the reference voltage $V_{REF1}$ and the resistance of the resistor R1, and giving the following equation (1). The voltage dividing circuit 102 comprises a plurality of voltage dividing resistors R3, R4. A first terminal of the voltage dividing resistor R3 is coupled to the supply voltage pin VCC of the driving unit 20 for receiving the supply voltage $V_C$. A first terminal of the voltage dividing resistor R4 is coupled to a second terminal of the voltage dividing resistor R3; a second terminal of the voltage dividing resistor R4 is coupled to the ground. The voltage dividing resistors R3, R4 are connected in series, and a reference voltage $V_{REF2}$ is generated after providing the supply voltage Vc.

$$I_{PC} = \frac{V_{REF1}}{R1} \quad (1)$$

The resistor R2 has a first terminal and a second terminal. The first terminal of the resistor R2 is coupled to the set pin ISET and the first terminal of the resistor R1 and receives the reference voltage $V_{REF1}$. The second terminal of the resistor R2 receives the reference voltage $V_{REF2}$. An adjusting current $I_A$ is generated at the resistor R2. The magnitude of the adjusting current $I_A$ is determined according to the reference voltage $V_{REF1}$, the reference voltage $V_{REF2}$, and the resistance of the resistor R2, and giving the following equation (2). Moreover, a reference current $I_{REF}$ output by the set pin ISET of the driving unit 20 is equal to the sum of the adjusting current $I_A$ and the predetermined current $I_{PC}$, and giving the following equation (3).

$$I_A = \frac{V_{REF1} - V_{REF2}}{R2} \quad (2)$$

$$I_{REF} = I_A + I_{PC} \quad (3)$$

The switch 100 has a first terminal, a second terminal, and a control terminal. The first terminal of the switch 100 is coupled to the second terminal of the resistor R3; the second terminal of the switch 100 is coupled to the ground; and the control terminal of the switch 100 receives the PWM signal $S_{PWM}$. The duty cycle of the PWM signal $S_{PWM}$ is used for determining the conduction time of the switch 100 and thus further controlling the voltage level of the reference voltage $V_{REF2}$. When the PWM signal $p_{PWM}$ is low level, the switch 100 is cut off. Then the voltage level of the reference voltage $V_{REF2}$ is produced by dividing the supply voltage $V_c$ using the resistors R3, R4. On the other hand, when the PWM signal $S_{PWM}$ is high level, the switch 100 is turned on. The node A is coupled to the ground via the switch 100 and lowering the voltage level of the node A. Namely, the voltage level of the reference voltage $V_{REF2}$ is lowered accordingly. Consequently, the voltage difference between the reference voltage $V_{REF1}$ and the reference voltage $V_{REF2}$ is increased, which increases the adjusting current $I_A$ and gives the following equation (4). In the equation (4), D is the percentage of high-level PWM signal $S_{PWM}$ during each period, that is, the duty cycle.

$$V_{REF2} = \frac{V_{CC} * R4}{R3 + R4} * (1 - D) \quad (4)$$

According to the above description, the voltage level of the reference voltage $V_{REF2}$ is determined according to the duty cycle of the PWM signal $S_{PWM}$ of this embodiment and hence changing the magnitude of the adjusting current $I_A$. Because the reference current $I_{REF}$ is the sum of the adjusting current $I_A$ and the predetermined current $I_{PC}$, the magnitude of the reference current $I_{REF}$ is also determined by the duty cycle of the PWM signal $S_{PWM}$. As the percentage of the duty cycle is higher, the value of the reference current $I_{REF}$ is higher; as the percentage of the duty cycle is lower, the value of the reference current $I_{REF}$ is lower.

In addition, the converting circuit 10 can further comprise voltage dividing resistor R5, R6, a diode D1, and/or a voltage stabilizing capacitor C1. The voltage dividing resistor R5 receives the PWM signal $S_{PWM}$ and is coupled to the control terminal of the switch 100. The voltage dividing resistor R6 is coupled between the control terminal of the switch 100 and the ground. The voltage dividing resistors R5, R6 are used for dividing the voltage of the PWM signal $S_{PWM}$ and outputting to the control terminal of the switch 100. The diode D1 has a positive terminal and a negative terminal. The positive terminal of the diode D1 is coupled to the second terminal of the voltage dividing resistor R3; the negative terminal of the diode D1 is coupled to the first terminal of the voltage dividing resistor R4. In the present invention, the diode D1 is regarded as an ideal diode used for preventing reverse flow of current. Thereby, there is no voltage drop when the diode D1 is forward biased and turned on, making the voltage level of the node A equal to the voltage level of the reference voltage $V_{REF2}$. The voltage stabilizing capacitor C1 has a first terminal and a second terminal. The first terminal of the voltage stabilizing capacitor C1 is coupled to the second terminal of the resistor R2; the second terminal of the voltage stabilizing capacitor C1. The voltage stabilizing capacitor C1 is used for stabilizing the voltage level of the reference voltage $V_{REF2}$.

Figure 5:
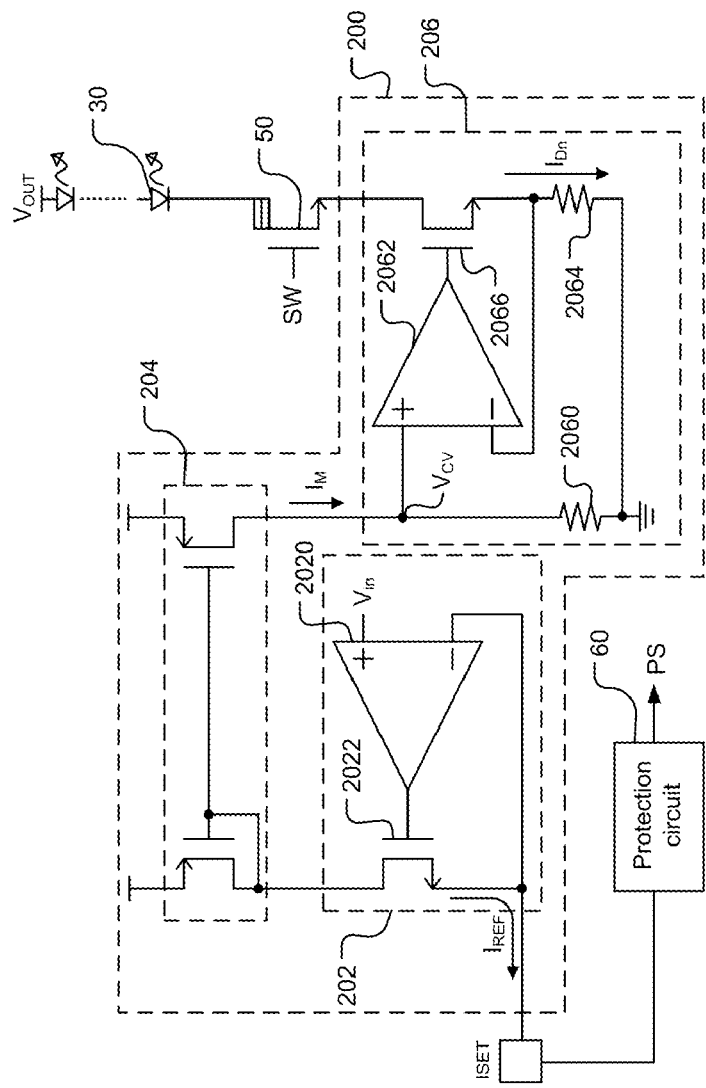
FIG. 5 shows a circuit diagram of the current control circuit according to a preferred embodiment of the present invention.

Please refer to FIG. 5, which shows a circuit diagram of the current control circuit according to a preferred embodiment of the present invention. As shown in the figure, the current control circuit 200 comprises a plurality of current generating circuit 202, 206 and a current mirror 204. The current generating circuit 202 is coupled to the set pin ISET of the driving unit 20, and generates the reference current $I_{REF}$ according to the adjusting current $I_A$ and the predetermined current $I_{PC}$. Besides, as shown in FIG. 4, the set pin ISET of the driving unit 20 is coupled to the converting circuit 10. The current mirror 204 is coupled to the current generating circuit 202 and mirrors the reference current $I_{REF}$ for producing a mirror current $I_M$. The current generating circuit 206 is coupled to the current mirror 204 and the LEDs 30, and generating the driving currents $I_{D1}$-$I_{Dn}$ according to the mirror current $I_M$ for driving the plurality of LEDs 30. For convenience, according to the present embodiment, the current control circuit 200 is coupled to an LED 30 only and the current generating circuit 206 generates a driving current $I_{Dn}$. Nonetheless, in practice, the current control circuit 200 can be coupled to a plurality of LEDs 30 and generating a plurality of driving currents $I_{D1}$-$I_{Dn}$ as shown in FIG. 2.

The current generating circuit 202 comprises an operational amplifier 2020 and a transistor 2022. A positive input of the operational amplifier 2020 receives an input voltage $V_{in}$, and a negative input of the operational amplifier 2020 is coupled to the set pin ISET of the driving unit 20. In addition, since the voltage levels of the positive and negative inputs are identical because of the characteristics of the operational amplifier, the voltage level of the negative input of the operational amplifier 2020 is equal to the input voltage $V_{in}$, which is transmitted to the converting circuit 10 via the set pin ISET and used as the reference voltage $V_{REF1}$, as shown in FIG. 4. The transistor 2022 is coupled between the current minor 204 and the set pin ISET and controlled by an output of the operational amplifier 2020. Thereby, the reference current $I_{REF}$ flows through the transistor 2022.

The current generating circuit 206 comprises a plurality of resistors 2060, 2064, an operational amplifier 2062, and a transistor 2066. The resistor 2060 is coupled to the current minor 204, receiving the minor current $I_M$, and the minor current $I_M$ is converted to a conversion voltage $V_{CV}$. A positive input of the operational amplifier 2062 is coupled to the resistor 2060 and receives the conversion voltage $V_{CV}$. The resistor 2064 is coupled between a negative input of the operational amplifier 2062 and the ground, and converts the conversion voltage $V_{CV}$ to the driving current $I_{Dn}$. The transistor 2066 is coupled between the LED 30 and the resistor 2064 and controlled by an output of the operational amplifier 2062. The driving current $I_{Dn}$ is generated at the resistor 2064 and flows through the transistor 2066.

According to the above equations (1), (2), and (3), the following equation (5) is deduced. In addition, in the framework in FIG. 5 of converting the reference current $I_{REF}$ to the driving current $I_{Dn}$, the driving current $I_{Dn}$ can be set to be identical to the reference current $I_{REF}$ by setting the current minor 204 and the resistors 2060, 2064. Nonetheless, the present invention is not limited to the case that the driving current $I_{Dn}$ should be identical to the reference current $I_{REF}$.

$$I_{REF} = I_A + I_{PC} = 1000 * \left( \frac{V_{REF1} - V_{REF2}}{R2} + \frac{V_{REF1}}{R1} \right) \quad (5)$$

Moreover, the driving circuit 1 can further comprises an output switch 50 and/or a protection circuit 60. The output switch 50 is coupled between the transistor 2066 and the LED 30, controlled by the switching signal SW or the gate control signal $V_G$ for providing the driving current $I_{Dn}$ to the LED 30. The protection circuit 60 is coupled to the set pin ISET of the driving unit 20, and generates a protection signal PS to stop the operation of the driving circuit 1 when the set pin ISET is short circuit detected.

Figure 6A:
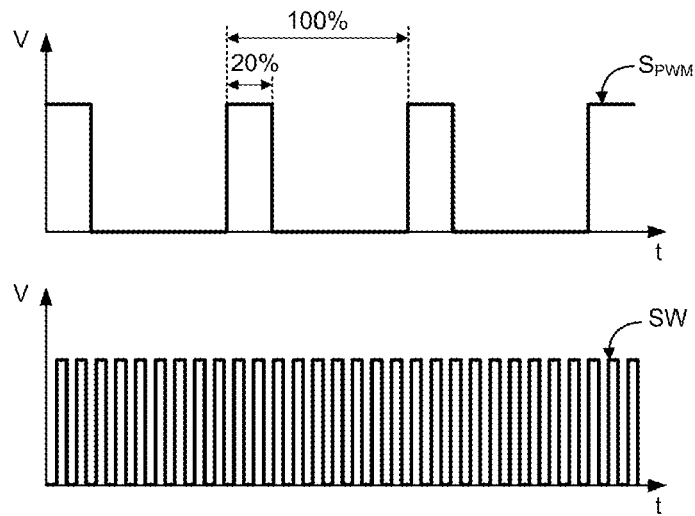
FIG. 6A shows waveforms of PWM versus switching signals according to a preferred embodiment of the present invention.
Figure 6B:
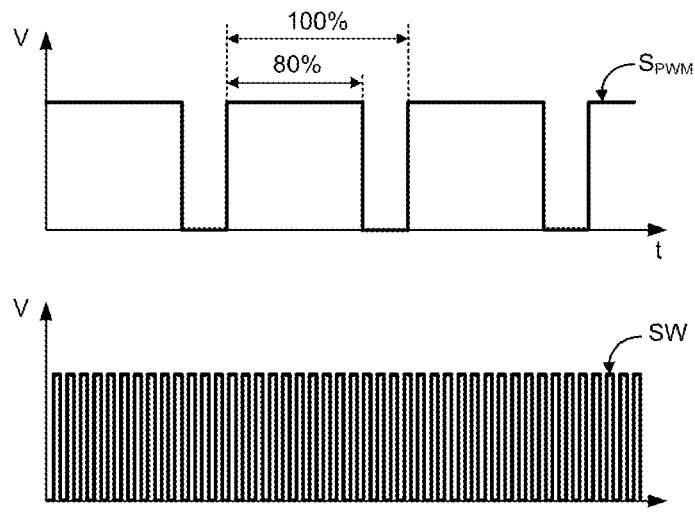
FIG. 6B shows waveforms of PWM versus switching signals according to another preferred embodiment of the present invention.

Please refer to FIGS. 3, 4, 5, 6A, and 6B concurrently. FIG. 6A shows waveforms of PWM versus switching signals according to a preferred embodiment of the present invention; and FIG. 6B shows waveforms of PWM versus switching signals according to another preferred embodiment of the present invention.

As shown in the figure, because the bright-controlling pin DBRT if the driving unit 20 receives the always-high enable signal ENS as the control signal and the comparator 230 generates the switching signal SW after comparing the enable signal ENS and the saw-toothed signal $STS_1$ for controlling turning on or off of the LED 30, the LED 30 is switched according to the PWM signal $S_{PWM}$. As shown in FIGS. 6A and 6B, no matter the duty cycle of the PWM signal $S_{PWM}$ is 20% or 80%, both of the switching signal SW and the gate control signal keep turning on the LED 30 continuously and thus making the driving current $I_{Dn}$ flow through the LED 30 continuously. Thereby, there will be no glitter phenomenon.

In addition, in the converting circuit 10 according to the present invention, if the resistance of the resistor R1 is 61 KΩ, the resistance of the resistor R2 is 15.25 KΩ, the resistance of the voltage dividing resistor R3 is 2.78 KΩ, the resistance of the voltage dividing resistor R4 is 1.22 KΩ, the voltage level of the supply voltage $V_C$ is 5V, the voltage level of the reference voltage $V_{REF1}$ will be 1.22V.

Thereby, according to the embodiment in FIG. 6A, the duty cycle of the PWM signal $S_{PWM}$ is 20%. From the equation (4), the voltage of $V_{REF2}$ is 1.22V. Besides, from the equation (5), the driving current $I_{Dn}$ is 20 mA. According to the embodiment in FIG. 6B, from the equation (4), the voltage level of $V_{REF2}$ is 0.305V; from the equation (5), the driving current $I_{Dn}$ is 80 mA.

Accordingly, the converting circuit 10 according to the present invention can convert the PWM signal $S_{PWM}$ to the adjusting current $I_A$ varied according to the duty cycle of the PWM signal $S_{PWM}$. Thereby, the current control circuit 200 of the driving unit 20 adjusts the magnitude of the driving current according to the adjusting current $I_A$, and hence adjusting the brightness of the LED 30. Consequently, according to the present invention, because the adjustment of the brightness of the LED 30 is not necessarily done by adjusting the turn-on and turn-off of the LED 30, the glitter phenomenon can be avoided.

In summary, the driving circuit of LED according to the present invention comprises a converting circuit and a driving unit. The converting circuit can convert the PWM signal to the adjusting current $I_A$ varied according to the duty cycle of the PWM signal. Thereby, the driving unit can adjust the magnitude of the driving current according to the adjusting current and hence adjusting the brightness of the LED. Consequently, according to the present invention, because the adjustment of the brightness of the LED is not necessarily done by adjusting the turn-on and turn-off of the LED 30, the glitter phenomenon can be avoided.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A driving circuit of light-emitting diode, comprising:
    a converting circuit, receiving a pulse width modulation signal (PWM), and producing an adjusting current according to said pulse width modulation signal; and
    a driving unit, receiving said adjusting current, producing at least one driving current according to said adjusting current for driving a plurality of light-emitting diodes coupled to said driving unit, and the magnitude of said driving current is adjusted according to said adjusting current;
    wherein said driving unit has a bright-controlling pin used for receiving a control signal having a fixed level; and
    wherein said converting circuit comprises:
        a first resistor, having a first terminal and a second terminal, said first terminal of said first resistor coupled to a set pin of said driving unit for receiving a first reference voltage, said second terminal of said first resistor coupled to a ground;
        a second resistor, having a first terminal and a second terminal, said first terminal of said second resistor coupled to said set pin of said driving unit and said first terminal of said first resistor for receiving said first reference voltage, said second terminal of said second resistor receiving a second reference voltage, wherein the magnitude of said adjusting current is determined according to said first reference voltage, said second reference voltage, and said second resistor; and
        a switch, having a first terminal, a second terminal, and a control terminal, said first terminal of said switch receiving said second reference voltage, said second terminal of said switch coupled to said ground, said control terminal of said switch receiving said pulse width modulation signal, and the duty cycle of said pulse width modulation signal determining the conduction time of said switch and controlling the voltage level of said second reference voltage.

2. The driving circuit of claim 1, wherein said converting circuit further comprises a voltage dividing circuit, receiving a supply voltage and coupled to said ground, and dividing said supply voltage and producing said second reference voltage.

3. The driving circuit of claim 1, wherein said converting circuit produces a predetermined current at said first resistor; the magnitude of said predetermined current is determined according to said first reference voltage and said first resistor; and said driving unit produces said driving current according to said adjusting current and said predetermined current.

4. The driving circuit of claim 1, wherein said converting circuit further comprises a voltage stabilizing capacitor, having a first terminal and a second terminal, said first terminal of said voltage stabilizing capacitor coupled to said second terminal of said second resistor, and said second terminal of said voltage stabilizing capacitor coupled to said ground for stabilizing said second reference voltage.

5. The driving circuit of claim 1, wherein said driving unit comprises:
a first current generating circuit, coupled to a set pin of said driving unit, producing a reference current according to said adjusting current, and said set pin coupled to said converting circuit;
a current mirror, coupled to said first current generating circuit, and producing a mirror current according to said reference current; and
a second current generating circuit, coupled to said current mirror and said plurality of light-emitting diodes, and producing said driving current according to said mirror current for driving said plurality of light-emitting diodes.

6. The driving circuit of claim 5, wherein said first current generating circuit comprises:
an operational amplifier, having a positive input, a negative input, and an output, said positive input receiving an input voltage, said negative input coupled to said set pin of said driving unit; and
a transistor, coupled between said current and said set pin of said driving unit, and controlled by said output of said operational amplifier to make said reference current flow through said transistor.

7. The driving circuit of claim 5, wherein said second current generating circuit comprises:
a first resistor, coupled to said current mirror, and converting said mirror current to a conversion voltage;
an operational amplifier, having a positive input, a negative input, and an output, and said positive input coupled to said first resistor for receiving said conversion voltage;
a second resistor, coupled between said negative input of said operational amplifier and a ground; and
a transistor, coupled between said plurality of light-emitting diodes and said second resistor, and controlled by said output of said operational amplifier to make said driving current flow through said transistor.

8. The driving circuit of claim 1, and further comprising an output switch, coupled between said driving unit and said plurality of light-emitting diodes, and controlled by a switching signal for providing said driving current to said plurality of light-emitting diodes.

9. The driving circuit of claim 1, and further comprising a protection circuit, coupled to a set pin of said driving unit, and controlling said driving circuit to stop operating when said set pin is short circuit detected.

10. A driving method of light-emitting diode, comprising the steps of:
transmitting a pulse width modulation signal to a converting circuit, and producing an adjusting current according to said pulse width modulation signal;
transmitting said adjusting current to a driving unit, producing at least one driving current according to said adjusting current for driving a plurality of light-emitting diodes, and the magnitude of said driving current is adjusted according to said adjusting current; and
transmitting a control signal having a fixed level to a bright-controlling pin;
wherein said step of "producing an adjusting current according to said pulse width modulation signal" comprises the steps of:
transmitting a first reference voltage to a first terminal of a first resistor and a first terminal of a second resistor within said converting circuit;
transmitting a second reference voltage to a second terminal of said second resistor, and determining the magnitude of said adjusting current according to said first reference voltage, said second reference voltage, and said second resistor; and
determining the conduction time of a switch according to the duty cycle of said pulse width modulation signal and controlling the voltage level of said second reference voltage.

11. The driving method of claim 10, and further comprising a step of transmitting a supply voltage to a voltage dividing circuit of said converting circuit and dividing said supply voltage for producing said second reference voltage.

12. The driving method of claim 10, and further comprising steps of:
producing a predetermined current at said first resistor according to said first reference voltage, and determining the magnitude of said predetermined current according to said first reference voltage and said first resistor; and
producing said driving current according to said adjusting current and said predetermined current.

13. The driving method of claim 10, wherein said step of "transmitting said adjusting current to a driving unit, producing at least a driving current according to said adjusting current for driving a plurality of light-emitting diodes" comprises:
transmitting said adjusting current to a first current generating circuit of said driving unit, and producing a reference current according to said adjusting current;
transmitting said reference current to a current mirror of said driving unit, and producing a mirror current according to said reference current; and
transmitting said mirror current to a second current generating circuit of said driving unit, and producing said driving current according to said mirror current for driving said plurality of light-emitting diodes.

14. The driving method of claim 13, wherein said step of "transmitting said adjusting current to a first current generating circuit of said driving unit, and producing a reference current according to said adjusting current" comprises:
transmitting an input voltage to a positive input of an operational amplifier; and
switching a transistor according an output of said operational amplifier to make said reference current flow through said transistor.

15. The driving method of claim 13, wherein said step of "transmitting said reference current to a current mirror of said driving unit, and producing a mirror current according to said reference current" comprises:
transmitting said mirror current to a first resistor, and converting said mirror current to a conversion voltage;
transmitting said conversion voltage to a positive input of an operational amplifier, and outputting said conversion voltage via a negative input of said operational amplifier;
transmitting said conversion voltage to a second resistor; and
switching a transistor according an output of said operational amplifier to make said second resistor produce said driving current according to said conversion voltage and said reference current flow through said transistor.

16. The driving method of claim 10, further comprising:
switching an output switch according a switching signal for providing said driving current to said plurality of light-emitting diodes.

17. The driving method of claim 10, further comprising:
   detecting a set pin of said driving unit, and producing a protection signal to stop said driving circuit when said set pin is short circuit.

* * * * *